(12) United States Patent
Blair-Stanek

(10) Patent No.: US 7,617,204 B2
(45) Date of Patent: Nov. 10, 2009

(54) CONDITIONAL NAVIGATION THROUGH HIERARCHICAL LISTS

(75) Inventor: Andrew Blair-Stanek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 105 days.

(21) Appl. No.: 10/941,117

(22) Filed: Sep. 15, 2004

(65) Prior Publication Data

US 2006/0059182 A1 Mar. 16, 2006

(51) Int. Cl.
*G06F 7/00* (2006.01)
(52) U.S. Cl. .............................. 707/5; 707/10; 707/101; 345/418
(58) Field of Classification Search ........................ None
See application file for complete search history.

(56) References Cited

U.S. PATENT DOCUMENTS

| | | | | |
|---|---|---|---|---|
| 5,428,776 A * | 6/1995 | Rothfield | ......................... | 707/4 |
| 5,544,360 A * | 8/1996 | Lewak et al. | ..................... | 707/1 |
| 5,701,137 A * | 12/1997 | Kiernan et al. | .............. | 715/853 |
| 5,740,444 A * | 4/1998 | Frid-Nielsen | ................ | 717/102 |
| 5,787,411 A * | 7/1998 | Groff et al. | ..................... | 707/2 |
| 6,112,209 A * | 8/2000 | Gusack | ......................... | 707/101 |
| 6,243,094 B1 * | 6/2001 | Sklar | ........................... | 715/853 |
| 6,826,566 B2 * | 11/2004 | Lewak et al. | ..................... | 707/4 |
| 7,131,069 B1 * | 10/2006 | Rush et al. | .................... | 715/738 |
| 2001/0003455 A1 * | 6/2001 | Grobler | ....................... | 345/418 |
| 2002/0078005 A1 * | 6/2002 | Shi et al. | ......................... | 707/1 |
| 2003/0033192 A1 * | 2/2003 | Zyman et al. | .................. | 705/10 |
| 2005/0097084 A1 * | 5/2005 | Balmin et al. | ................... | 707/3 |

* cited by examiner

*Primary Examiner*—Tim T. Vo
*Assistant Examiner*—Hasanul Mobin
(74) *Attorney, Agent, or Firm*—Merchant & Gould, P.C.

(57) ABSTRACT

The present invention provides a method and system for conditional navigation through hierarchical lists. Filtering parameters are associated with members in a list, such as a hierarchical list. The filtering parameters affect the number of choices that are shown to a user in another list when that list is selected and displayed to the user. A selection of a member having filtering parameters within a master list affects the choices shown to a user in other master lists and/or filtered lists when they are displayed. The filtering may occur across different processes within the same machine and across different machines. For example, a user may make a selection within a master list on a first machine that causes a list on a second machine to be filtered for presentation to another user.

25 Claims, 9 Drawing Sheets

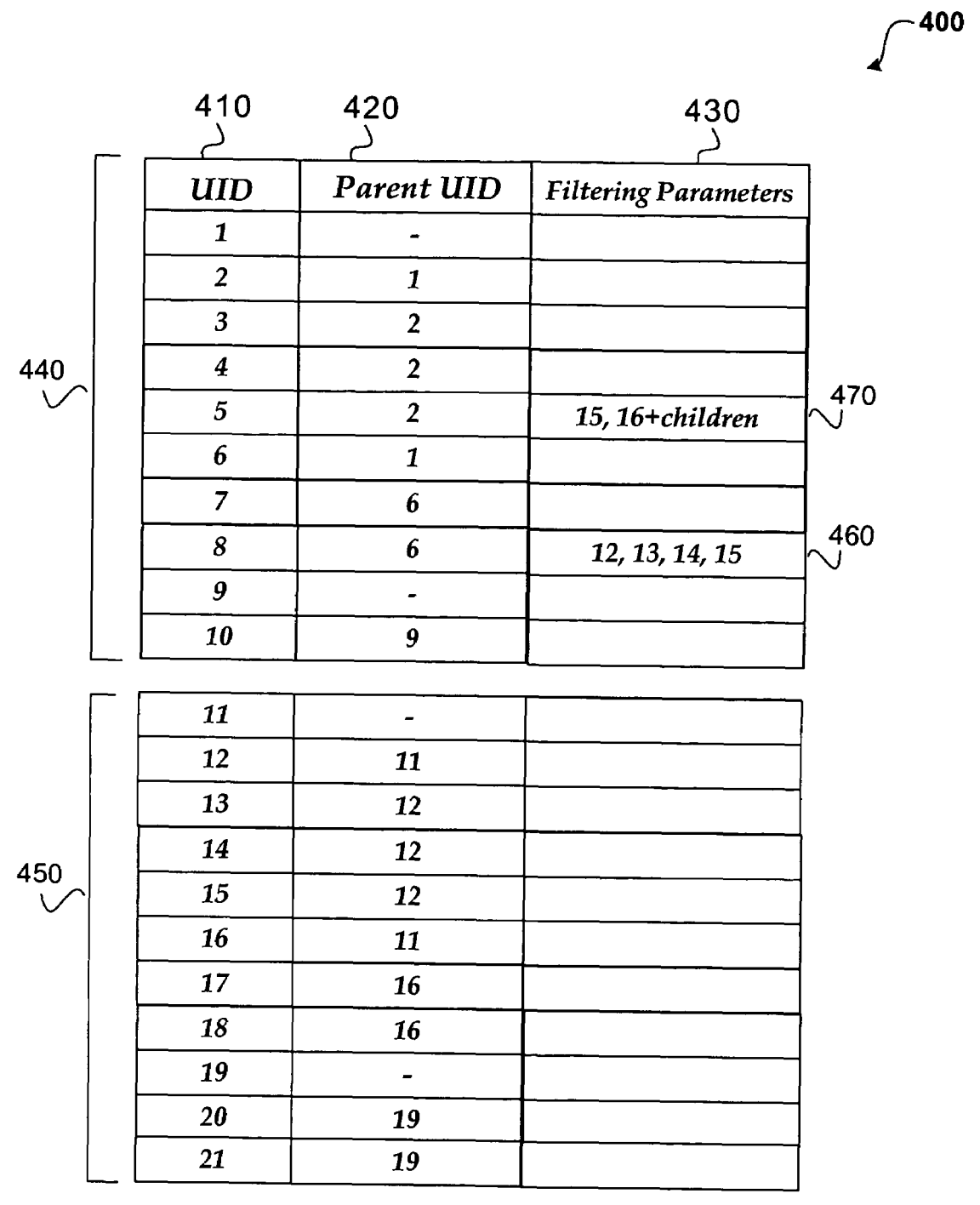

| UID | Parent UID | Filtering Parameters |
|---|---|---|
| 1 | - | |
| 2 | 1 | |
| 3 | 2 | |
| 4 | 2 | |
| 5 | 2 | 15, 16+children |
| 6 | 1 | |
| 7 | 6 | |
| 8 | 6 | 12, 13, 14, 15 |
| 9 | - | |
| 10 | 9 | |
| 11 | - | |
| 12 | 11 | |
| 13 | 12 | |
| 14 | 12 | |
| 15 | 12 | |
| 16 | 11 | |
| 17 | 16 | |
| 18 | 16 | |
| 19 | - | |
| 20 | 19 | |
| 21 | 19 | |

*Fig. 4*

CONDITIONAL NAVIGATION THROUGH HIERARCHICAL LISTS

BACKGROUND OF THE INVENTION

Hierarchical lists allow data to be classified and displayed to a user in a hierarchical fashion. Generally, hierarchical lists classify data into types and subtypes in a tree-like fashion. Each type of data may have one or more subtypes listed below it. Similarly, each subtype may include one or more subtypes, recursively. Hierarchical lists are ideal for representing data that is naturally hierarchical. One such type of data is location data. For example, location data may be structured by continent followed by country and followed by city. Another type of data that benefits from a hierarchical display is organizational data, such as a management structure or a skills structure for an organization. These lists, however, may become very large and difficult to navigate.

SUMMARY OF THE INVENTION

The present invention is directed at providing a method and system for conditional navigation through hierarchical lists.

According to one aspect of the invention, filtering parameters are associated with members in a list, such as a hierarchical list. The filtering parameters affect the number of choices that are shown to a user in another list when that list is selected. A selection within a master list may affect the choices in other master lists and/or filtered lists. Therefore, a selection in one list may affect the display of many other lists.

According to yet another aspect of the invention, the filtering may occur across different processes within the same machine and across different machines. For example, a user may make a selection within a master list on a first machine that causes a list on a second machine to be filtered.

BRIEF DESCRIPTION OF THE DRAWINGS

FIG. 4 shows a structure table including filtering parameters;

DETAILED DESCRIPTION OF THE PREFERRED EMBODIMENT

Generally, the present invention is directed at providing a method and system for conditional navigation through hierarchical lists. Filtering information is associated with members of the list. When a member of a list is selected, filtering information may be applied to other members within the list or other lists.

Illustrative Operating Environment

Figure 1:
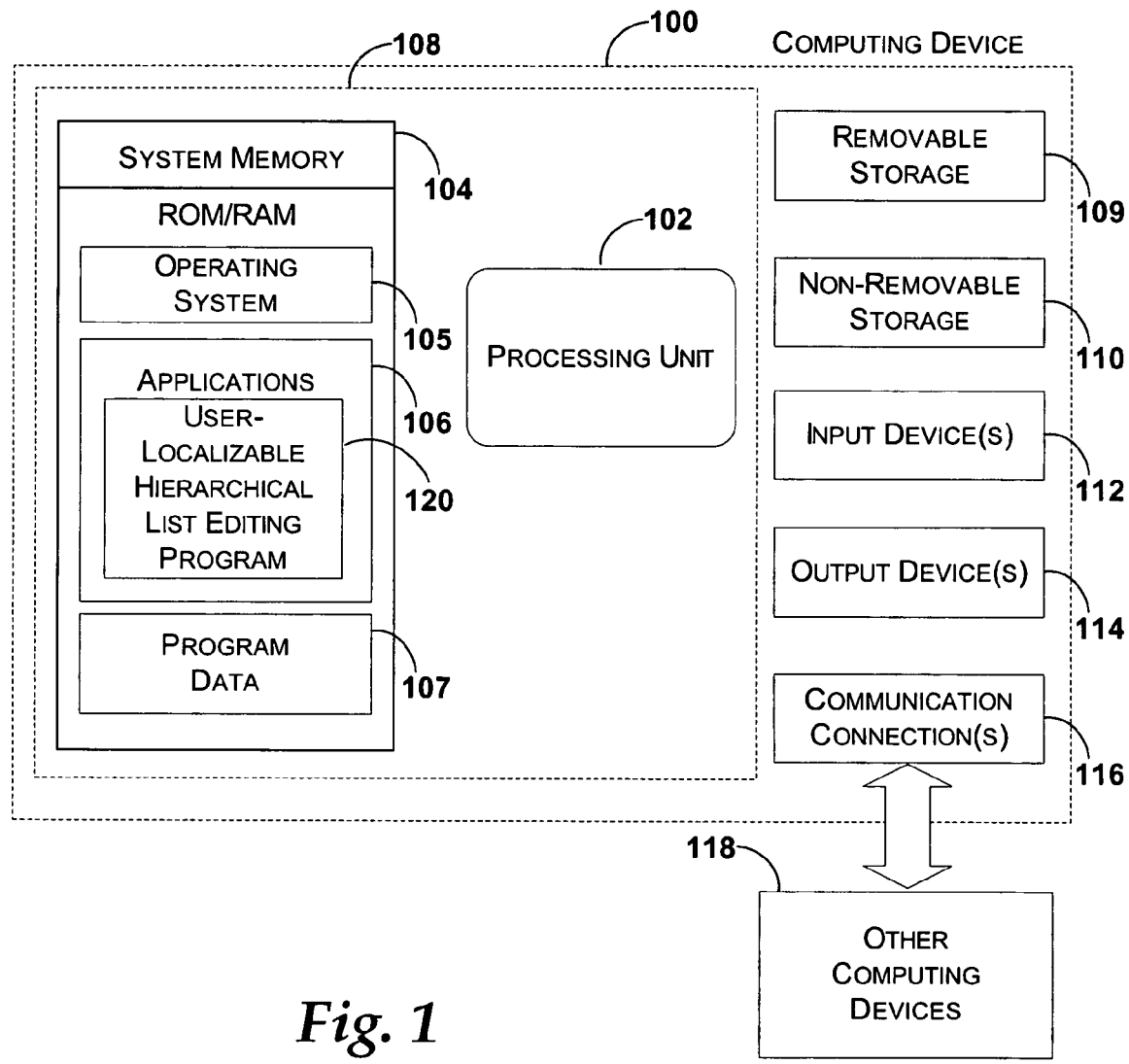
FIG. 1 illustrates an exemplary computing device that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include list filtering program 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Conditional Navigation Filtering System

Hierarchical lists are used in many different scenarios. While the examples disclosed are related to location and skills hierarchical lists, any type of list may be used in accordance with the invention. Users have created some lists that are so large that end-users are often bewildered by the huge number of options from which they can select.

Figure 2:
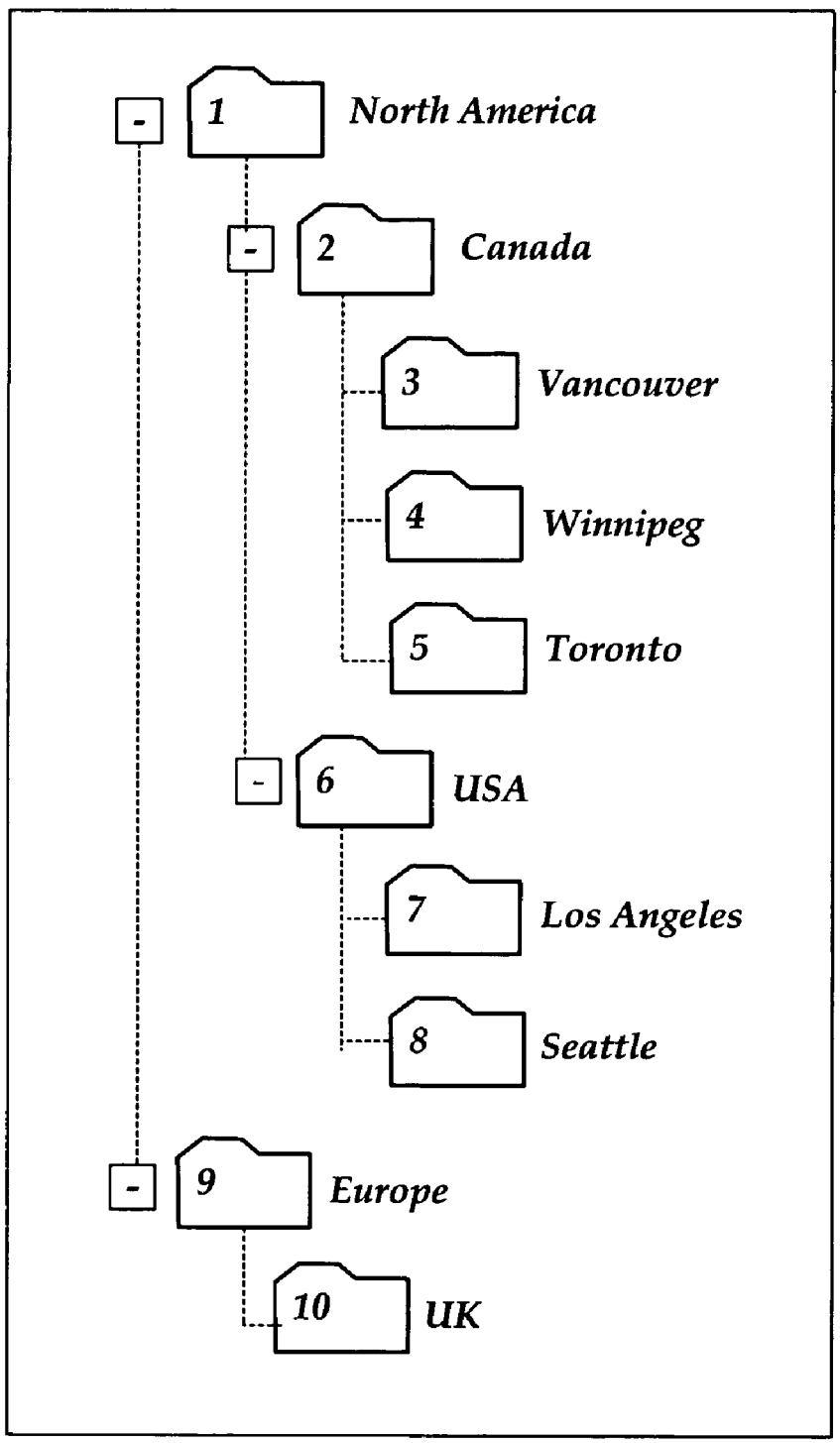
FIG. 2 shows a portion of a location hierarchical list.

FIG. 2 shows a portion of a location hierarchical list, in accordance with aspects of the invention. As illustrated, portion 200 includes a portion of a location list including North America and a part of Europe. North America is a root node and includes Canada and the USA. Canada is a parent of Vancouver, Winnipeg, and Toronto. USA is a parent of Los Angeles and Seattle. Europe is a root node and is a parent of the UK.

Figure 3:
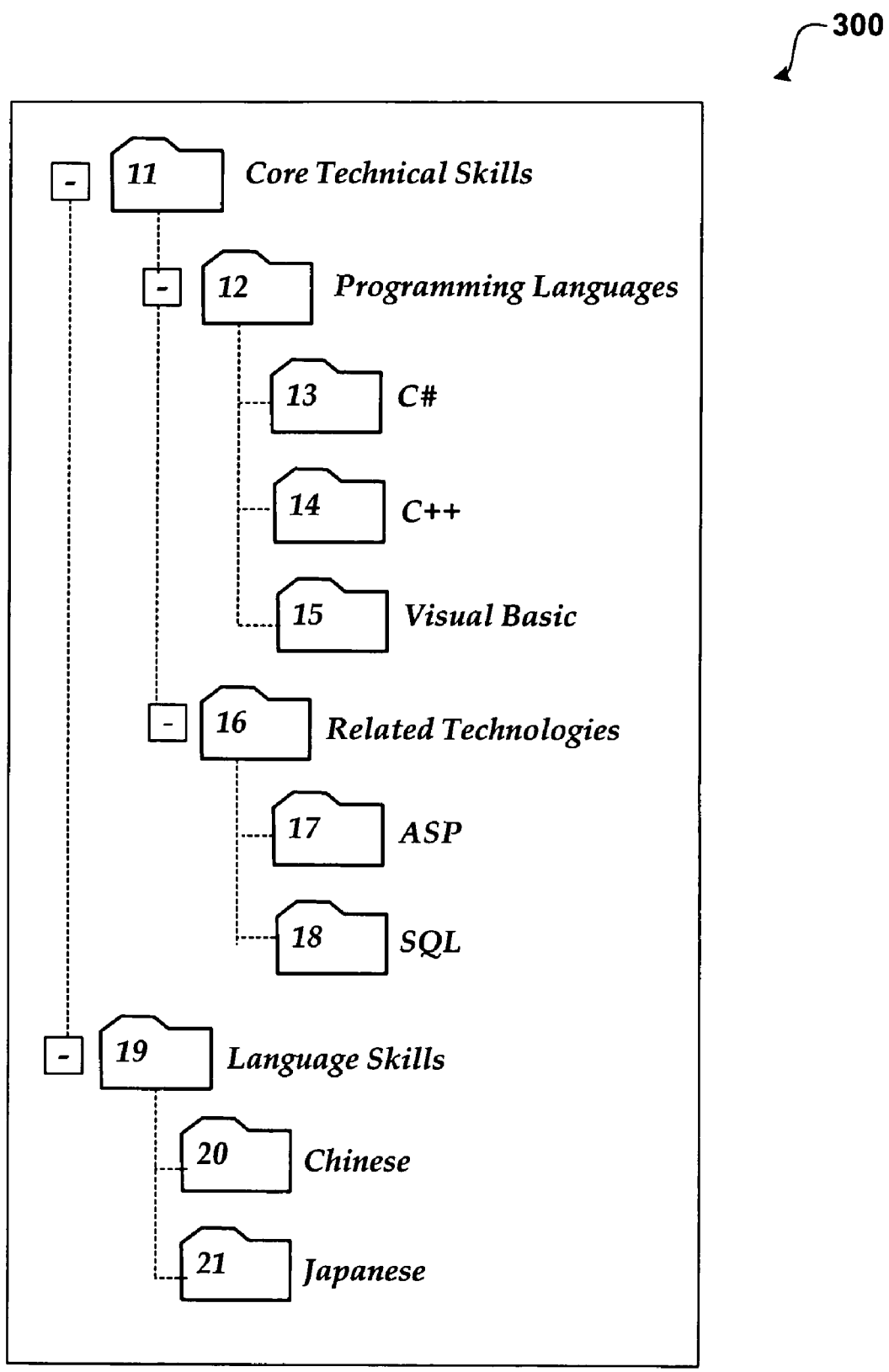
FIG. 3 shows a portion of a skill hierarchical list.

FIG. 3 shows a portion of a skill hierarchical list, in accordance with aspects of the invention. As illustrated, portion 300 includes a portion of a skills list including core technical skills and language skills. The core technical skills member includes programming languages and related technologies directly below its level. Programming languages includes C#, C++, and Visual Basic as children. The related technologies member includes ASP and SQL as its children. Language skills includes Chinese and Japanese as children.

FIG. 4 shows a structure table including filtering parameters, in accordance with aspects of the present invention.

Structure 400 defines the relationship between the members of a list and includes the filtering parameters that are used to narrow selection choices to a user. In this example, structure 400 represents the underlying hierarchical structure corresponding to the hierarchical list displayed in FIG. 2 and the hierarchical list displayed in FIG. 3. The structure includes UID (unique identifier) column 410, parent UID column 420 and filtering parameters column 430.

UID column 410 includes a unique ID for each member of the hierarchical list. There are ten unique members in the portion of the hierarchical list displayed in FIG. 2 and eleven unique members in the portion of the hierarchical list displayed in FIG. 3. In this particular example, North America's UID is 1, Canada's UID is 2, Vancouver's UID is 3, Winnipeg's UID is 4, Toronto's UID is 5, USA's UID is 6, Los Angeles' UID is 7, Seattle's UID is 8, Europe's UID is 9 and the UK's UID is 10. The UIDs are shown sequentially to simplify the example. The UIDs may be any UID for the member.

Similarly, the UIDs for the list displayed in FIG. 3 are as follows: core technical skills UID is 11, programming languages UID is 12, C#'s UID is 13, C++'s UID is 14, Visual Basic's UID is 15, related technologies UID is 16, ASP's UID is 17, SQL's UID is 18, language skills UID is 19, Chinese UID is 20 and Japanese UID is 21. Again, these UIDs are sequential to themselves and relative to the UIDs in the previous list for simplicity of this example.

While the UIDs are shown as integers within structure 400, any type of unique identifier may be used to represent the members as long as each member within each list may be uniquely identified. According to one embodiment, the UIDs are Globally Unique IDentifiers (GUIDs) which have a form, such as: {D8E764C1-41EB-8838-A 0238CEB35B0}. According to one embodiment, each UID within each hierarchical list is unique. According to another embodiment, each UID within a single list is unique. When all of the members across lists do not have UIDs then the member of a list may be identified by tagging a name of the list with the UID. For example, to identify a member within the location list the following notation may be used: location:6 which identifies the USA member. Any method of uniquely identifying the members of the lists may be used.

Parent UID column 420 lists the UID of the parent for each of the members. In this particular example, location list 440 includes the following relationships: North America is a root node and therefore its parent UID is Null; Canada's parent UID is 1 (North America); Vancouver's parent UID is 2 (Canada); Winnipeg's parent UID is 2 (Canada); Toronto's parent UID is 2 (Canada); USA's parent UID is 1 (North America); Los Angeles' parent UID is 6 (USA); Seattle's parent UID is 6 (USA); Europe is a root node and therefore its parent UID is null; and the UK's parent UID is 9 (UK).

Skills list 450 includes the following relationships: Core technical skills parent UID is Null; programming languages parent UID is 11; C#'s parent UID is 12; C++'s parent UID is 12; Visual Basic's parent UID is 12, related technologies parent UID is 11; ASP's parent UID is 16; SQL's parent UID is 16; language skills parent UID is NULL; Chinese parent UID is 19 and Japanese parent UID is 19.

Filtering parameters column 430 contains the parameters that are used in filtering members of a list(s) when the parameters associated UID is selected. According to one embodiment of the invention, the parameters are the UIDs of the selections the user wants to be displayed when the UID of the member is selected. For example, suppose a user wanted to narrow the choices to only show programming language skills in the skills list when the Seattle member was selected in the location list. According to one embodiment, the user enters the UIDs of the members that should be displayed when the user selects Seattle member (8) in the location list. In this particular example, filtering parameters 460 for UID 8 (Seattle) is 12, 13, 14, and 15. Therefore, when Seattle is selected in the location list shown in FIG. 2, the skills list will only display the programming languages and its members in skills list displayed in FIG. 3. There are many different ways of defining filtering parameters that may be used.

According to another embodiment, the user may specify certain items within lists that should or should not be included when the member is selected. According to another embodiment, the user may use a search mechanism such as XPath (also XQuery), which is used to filter XML or any hierarchical data. According to one embodiment XML is used to represent the hierarchical list structure and XPath is used to define the filtering parameters. Using XPath the user may specify in the filtering parameters to include a parent and all of its children. In this particular example, the user could specify to include member 12 and all of its children.

In any one instance of conditional navigation, there are two hierarchical lists that include the Master List and the Filtered list. The filtered list is updated after causing a change to the master list. In the example just discussed, the location list is considered the master list and the skill list is considered the filtered list.

Another example is now presented to further clarify the invention. In this example, the master list is the location list and the filtered list is the skills list.

Suppose that the Toronto office of an organization only supports simple development in Visual Basic and Related, non-programming technologies (i.e.: ASP and SQL in the example above). In this example, there is no need to show other skills within the skills list. Filtering parameters could be set to filter on the selection of the "NorthAmerica.Canada.Toronto" member such that when it is selected, only "Visual Basic" and all children of "Related Technologies" are available for selection, with all other entries in the skills list either grayed out or removed from the list. Filtering parameters 470 illustrates one way of specifying this filtering. This filtering can be of immense value to organizations who use large lists and need to search the lists for certain items.

While the example illustrates only filtering one list off of a master list, many more lists may be filtered upon the selection of an item. For example, a single selection of one member may affect every list within an organization. Additionally, a master list may be filtered by another master list or multiple masters may filter a single list. When multiple masters attempt to filter a single list a priority scheme may be determined. The determination of how these filters apply could be a ranking of priority of the filters, a union of the filters, an intersection of the filters, or some other arbitrary combination of set arithmetic.

The lists may be represented in many different ways. Additionally, the use of a UID is not needed. For example, the lists may be represented using XML, or some other string based representation in which a UID may or may not be present. For instance, the following shows how two lists could be represented using XML without any UIDs.

```
<North America>
    <Canada>
        <Vancouver/>
        <Winnipeg/>
        <Toronto filterParameter="VisualBasic, RelatedTechnologies+children"/>
    </Canada>
    <USA>
        <Los Angeles/>
        <Seattle filterParameter="ProgrammingLanguages,C#,C++,VisualBasic" />
    </USA>
</NorthAmerica>
<Europe>
    <UK/>
</Europe>
<CoreTechnicalSkills>
    <ProgrammingLanguages>
        <C# />
        <C++ />
        <VisualBasic />
    </ProgrammingLanguages>
    <RelatedTechnologies>
        <ASP />
        <SQL />
    </RelatedTechnologies>
</CoreTechnicalSkills>
<LanguageSkills>
        <Chinese />
        <Japanese />
</LanguageSkills>
```

Figure 5:
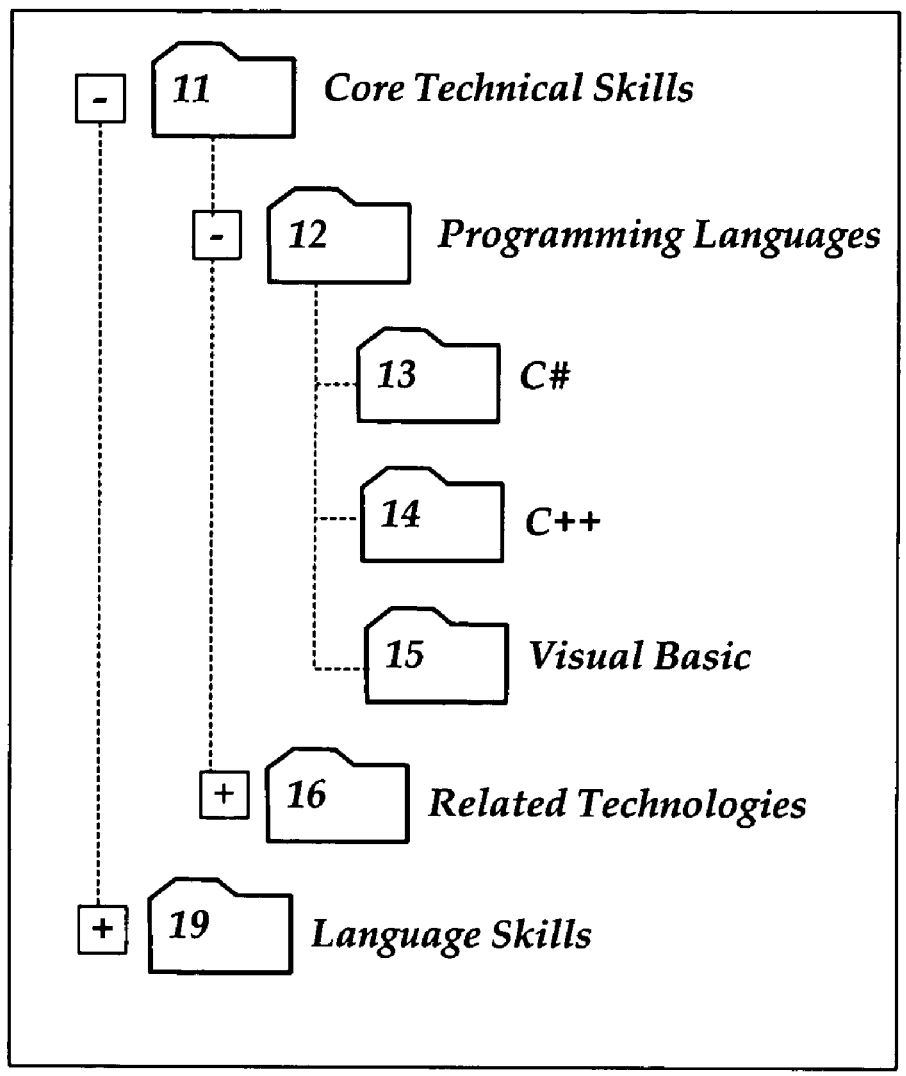
FIG. 5 illustrates collapse filtering.

FIG. 5 illustrates collapse filtering, in accordance with aspects of the invention. According to one embodiment of the invention, the filtering may result in collapse filtering.

In collapse filtering, the selection of the member in the master list only affects the way the filtered list displays its members and does not remove any of the members from the hierarchical list. FIG. 5 illustrates collapse filtering when the user has selected Seattle and includes the filtering parameters specified in the example above.

Referring to list 500, the technologies listed under the Related Technologies member and the languages listed under the Language Skills member have been collapsed. The user may still view the children of these members by selecting the plus "+" sign next to the collapsed member. Clicking again on the plus sign causes the descendents to reappear as they were before the filtering was applied.

Figure 6:
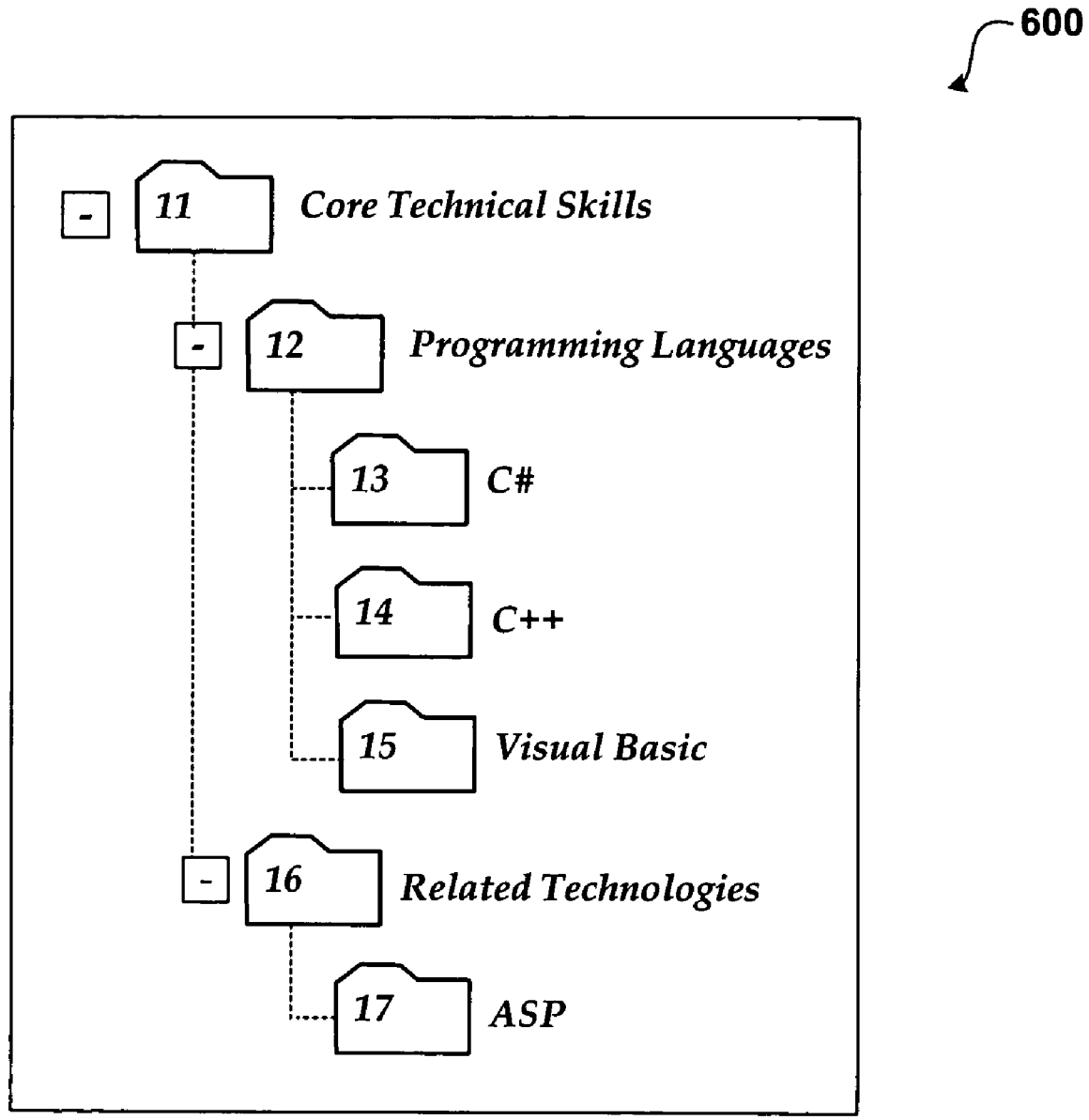
FIG. 6 shows mandatory filtering without clearing.

FIG. 6 shows mandatory filtering without clearing, in accordance with aspects of the invention.

In mandatory filtering without clearing selecting an item either removes the items in the list or makes them unavailable for selection unless an item was selected in the filtered list before selection. In the example above, if the user selected "Seattle", then all of the items in the skills list that were not specified in the filtering parameters are unavailable or disappear entirely. As illustrated, the items have been removed from the list. If the Skills list had already been selected to be "ASP" prior to selecting "Seattle" in the Location list, then the ASP value would remain visible.

Figure 7:
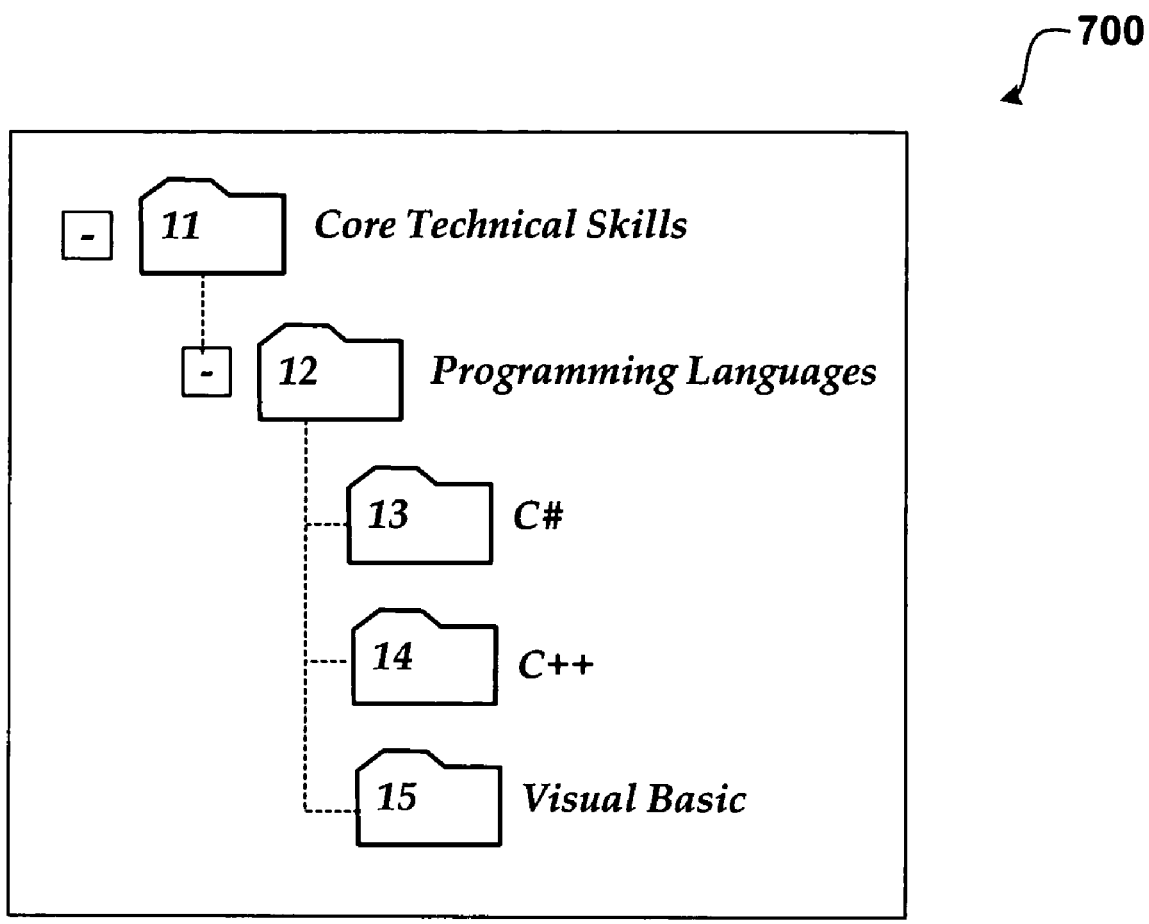
FIG. 7 shows mandatory filtering with clearing.

FIG. 7 shows mandatory filtering with clearing, in accordance with aspects of the invention.

In mandatory filtering without clearing selecting an item either removes the items in the list or makes them unavailable for selection. In the example above, if the user selected "Seattle," then all of the items in the skills list that were not specified in the filtering parameters are unavailable or disappear entirely.

Other types of filtering may also be used. For example, the members of the hierarchical list that are to be shown in the filtered list could be displayed as a flat list. According to one embodiment of the invention, the user specifies the type of filtering to apply. This filtering information can be stored in many different ways. For example, the filtering information could be stored on the per-item level along with the filter; or, it can be part of the data defining the relationship between the Master and the Filtered; or, it can be a setting of the program or system as a whole.

Figure 8:
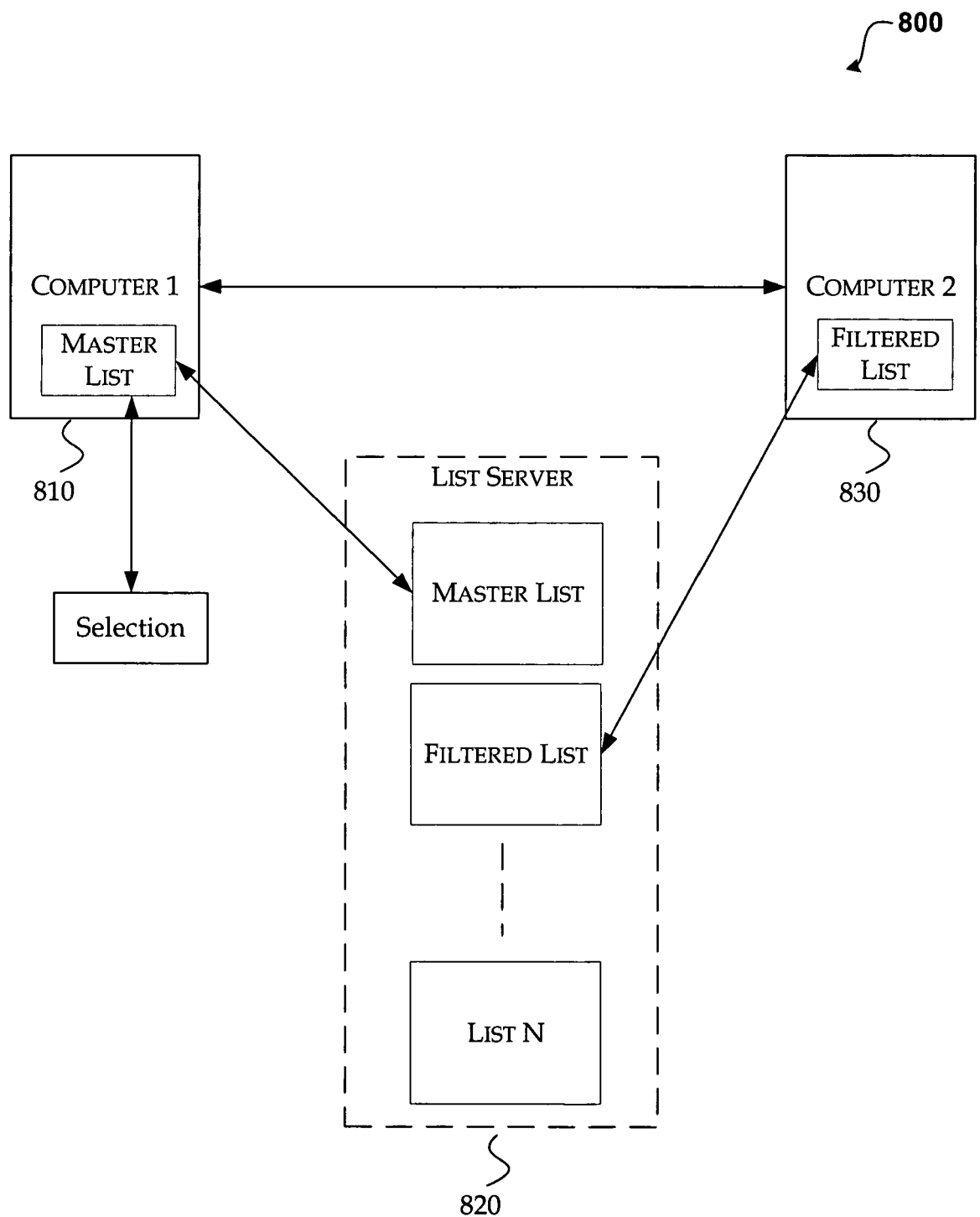
FIG. 8 illustrates two computers interacting with master and filtered lists.

FIG. 8 illustrates two computers interacting with master and filtered lists, in accordance with aspects of the invention. Filtering of a list can occur in many different places. For example, a user could make a selection within a master list on computer 1 (810) and affect a filtered list as offered for selection on computer 2 (830). When a selection is made to the master list on computer 1 (810), the filtered list may be created when needed on computer 2 (830). Additionally, optional list server (820) may be employed to store many of the lists, including master and filter lists. For example, the master list on computer 810 and the filtered list on computer 830 may be stored on list server 820. List server 820 may also be employed to apply the filtering parameters to the lists.

According to one embodiment, the timing between when a selection of a member occurs on the master list and when filtering occurs on the filtered list may be specified. For example, a user may desire to limit the time between a selection and filtering. Another user, on the other hand, may not desire to have a time limit between the selection and the filtering.

Figure 9:
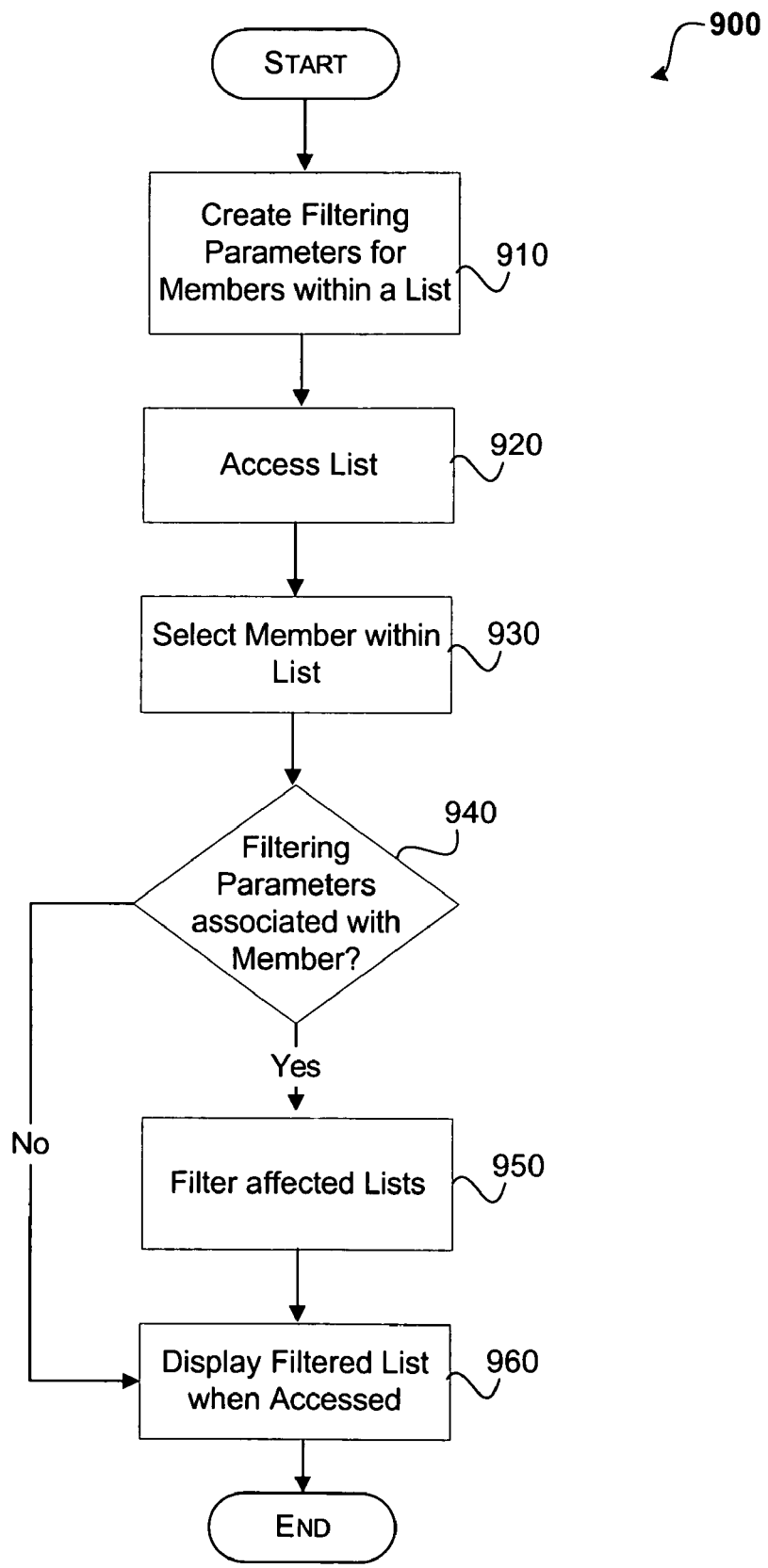
FIG. 9 illustrates a process flow for conditional navigation of hierarchical lists; in accordance with aspects of the invention.

FIG. 9 illustrates a process flow for conditional navigation of hierarchical lists, in accordance with aspects of the invention. After a start block, the process moves to block 910 where the filter parameters for members within a list(s) are set. As discussed above, the filtering parameters associated with a member within the list narrow the choices for selection in other lists when that member is selected.

Moving to block 920, a user accesses a master list. Once the user has accessed a list, the process moves to block 930 where a member within the list is selected.

Transitioning to decision block 940, a determination is made as to whether the member that was selected has any associated filtering parameters that may affect the display of other lists. When there are filtering parameters associated with the member, the process moves to block 950 where the affected lists are filtered. This filtering may occur in conjunction with filtering via other lists, in some specified set-arithmetic manner. According to one embodiment, the affected lists are not filtered until they are accessed by a user. The process then moves to block 960. When there are no filter parameters associated with the member, the process moves to block 960.

At block 960, the filtered list is displayed when it is accessed by a user. The process then moves to an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for conditional navigation through a list, comprising:

assigning a unique identifier to each member of a master list and assigning a unique identifier to each member of at least one filtered list; wherein each of the unique identifiers that are associated with the members of the master list and the at least one filtered list are different;

associating a filtering parameter with a member in the master list that provides filtering information for the at least one filtered list; wherein the master list and the at least one filtered list each include different members; wherein the filtering parameter includes at least two unique identifiers from the at least one filtered list that specify what members to display from the at least one filtered list when the member having the associated filtering parameter in the master list is selected;

displaying the master list separately from the at least one filtered list;

determining when the member having the associated filtering parameter in the master list has been selected;

filtering the at least one filtered list after the selection of the member in the master list;

determining whether a child member of the at least one filtered list was selected before selection of the member in the master list, the child member not specified by the filtering parameter;

in response to determining the child member was selected before selection of the member in the master list:
  displaying the child member and the specified members from the at least one filtered list;

in response to determining the child member was not selected before selection of the member in the master list:
  displaying the specified members from the at least one filtered list and not displaying the child member.

2. The method of claim 1, wherein the master list is a hierarchical list and the at least one filtered list is another hierarchical list; and further comprising assigning a parent unique identifier to each of the members in the master list and the at least one filtered list that have parents.

3. The method of claim 1, wherein the filtering further comprises selecting one of: collapse filtering; mandatory filtering without clearing; and mandatory filtering with clearing.

4. The method of claim 1, further comprising applying at least one of a ranking of priority of filters; a union of the filters, an intersection of the filters, or a combination of set arithmetic when it is determined that at least one of the other filtered lists has also been filtered by another master list.

5. The method of claim 1, wherein associating the filtering parameter with the member in the master list, comprises indicating at least one member in the at least one filtered list that is included after filtering.

6. The method of claim 1, wherein associating the filtering parameter with the member in the master list, comprises indicating at least one member in the at least one filtered list that is removed after filtering.

7. The method of claim 1, wherein the filtering is performed using at least one of an Xpath and an Xquery search.

8. The method of claim 1, further comprising assigning an integer to act as each of the unique identifiers within the master list and the at least one other list.

9. The method of claim 8, wherein the filtering parameter includes the unique identifiers of members to be filtered in the at least one other list.

10. A computer program product stored in a computer-readable storage medium executed by the computer for conditionally navigating through a list, the instructions comprising:

assigning a unique identifier to each member of a master list and assigning a unique identifier to each member of a filtered list; wherein each of the unique identifiers that are associated with the members of the master list and the filtered list are different;

associating a filtering parameter with a member in the master list that provides filtering information for the filtered list; wherein the master list and the filtered list each include different members; wherein the filtering parameter specifying members from the filtered list to display upon selection of the member in the master list having the associated filtering parameter;

displaying the master list separately from the filtered list;

determining when the member in the master list has been selected;

filtering the filtered list after the selection of the member in the master list;

determining whether a child member of the filtered list was selected before selection of the member in the master list, the child member not specified by the filtering parameter:

in response to determining the child member was selected before selection of the member in the master list: displaying the child member and the specified members from the filtered list;

in response to determining the child member was not selected before selection of the member in the master list: displaying the specified members from the filtered list and not displaying the child member.

11. The computer-readable storage medium of claim 10, wherein the master list is a hierarchical list and the filtered list is another hierarchical list.

12. The computer-readable storage medium of claim 10, wherein the filtering further comprises filtering using at least one of: collapse filtering; mandatory filtering without clearing; and mandatory filtering with clearing.

13. The computer-readable storage medium of claim 10, further comprising applying at least one of a ranking of priority of filters; a union of the filters, an intersection of the filters, or a combination of set arithmetic when determined.

14. The computer-readable storage medium of claim 10, wherein associating the filtering parameter with the member in the master list, comprises indicating at least one member in the filtered list that is included after filtering.

15. The computer-readable storage medium of claim 10, wherein associating the filtering parameter with the member in the master list, comprises indicating at least one member in the filtered list that is removed from the list after filtering.

16. The computer-readable storage medium of claim 10, further comprising assigning an integer to act as each of the unique identifiers each member within the master list and the filtered list.

17. The computer-readable storage medium of claim 16, wherein the filtering parameter includes the unique identifiers of members to be filtered in the filtered list.

18. A system for conditionally navigating through a list, comprising:
a processor and a computer-readable storage;
an operating environment stored on the computer-readable medium and executing on the processor;
a display; and
an application operating under the control of the operating environment and operative to perform actions, including:
determining when a member in a master list has been selected; wherein each member in the master list is assigned a unique identifier;
determining when a filtering parameter is associated with the member in a master list, wherein the filtering parameter provides filtering information for a filtered list; wherein each member in the filtered list is assigned a unique identifier; wherein the master list and the filtered list each include different members; wherein the filtering parameter specifies members from the filtered list to display upon selection of the member in the master list having the associated filtering parameter; and wherein the master list is separate from the filtered list;
filtering the filtered list after the selection of the member in the master list;
determining whether a child member of the filtered list was selected before selection of the member in the master list, the child member not specified by the filtering parameter;
in response to determining the child member was selected before selection of the member in the master list: displaying the child member and the specified members from the filtered list;
in response to determining the child member was not selected before selection of the member in the master list: displaying the specified members from the at least one filtered list and not displaying the child member.

19. The system of claim 18, wherein the master list is a hierarchical list and the filtered list is another hierarchical list.

20. The system of claim 18, wherein the filtering further comprises filtering using one of: collapse filtering; mandatory filtering without clearing; and mandatory filtering with clearing.

21. The system of claim 18, further comprising applying at least one of a ranking of priority of filters; a union of the filters, an intersection of the filters, or a combination of set arithmetic.

22. The system of claim 18, wherein associating the filtering parameter with the member in the master list, comprises indicating at least one member in the filtered list to be included when filtered.

23. The system of claim 18, wherein associating the filtering parameter with the member in the master list, comprises indicating at least one member in the filtered list that is removed when filtered.

24. The system of claim 18, further comprising assigning a unique identifier to each member within the master list and the list.

25. The system of claim 24, wherein the filtering parameter includes the unique identifiers of members to be filtered in the list.

* * * * *